(12) United States Patent
Fiorini et al.

(10) Patent No.: US 9,616,740 B2
(45) Date of Patent: Apr. 11, 2017

(54) HYDRAULIC MODULE COMPRISING HIGH AND LOW PRESSURE ACCUMULATORS, FOR A HYBRID VEHICLE

(71) Applicant: Technoboost, Paris (FR)

(72) Inventors: Nelson Fiorini, Sagy (FR); Pascal Gateau, Parmain (FR)

(73) Assignee: TECHNOBOOST, Paris (FR)

( * ) Notice: Subject to any disclaimer, the term of this patent is extended or adjusted under 35 U.S.C. 154(b) by 97 days.

(21) Appl. No.: 14/758,772

(22) PCT Filed: Dec. 18, 2013

(86) PCT No.: PCT/FR2013/053149
§ 371 (c)(1),
(2) Date: Jun. 30, 2015

(87) PCT Pub. No.: WO2014/106704
PCT Pub. Date: Jul. 10, 2014

(65) Prior Publication Data
US 2015/0367722 A1 Dec. 24, 2015

(30) Foreign Application Priority Data
Jan. 7, 2013 (FR) ...................................... 13 50109

(51) Int. Cl.
*B60K 6/12* (2006.01)
*B60K 8/00* (2006.01)
*F15B 1/04* (2006.01)

(52) U.S. Cl.
CPC .................. *B60K 8/00* (2013.01); *B60K 6/12* (2013.01); *F15B 1/04* (2013.01); *B60Y 2400/14* (2013.01);
(Continued)

(58) Field of Classification Search
CPC ... B60K 6/12; B60K 6/40; B60K 8/00; B60K 2015/0633; B62D 65/00;
(Continued)

(56) References Cited

U.S. PATENT DOCUMENTS 4,520,840 A * 6/1985 Michel .................... B60K 6/12
137/259
6,257,360 B1 * 7/2001 Wozniak .............. B60K 15/013
180/69.5
(Continued)

FOREIGN PATENT DOCUMENTS

DE 102008061757 A1 6/2010
FR WO 2012123665 A1 * 9/2012 ............... B60K 6/12
(Continued)

OTHER PUBLICATIONS

SAE Technical Paper Series 2002-01-3128, R.P. Kepner, Ford Motor Company, Hydraulic Power Assist—A Demonstration of Hydraulic Hybrid Vehicle Regenerative Braking in a Road Vehicle Application, Nov. 18-20, 2002, pp. 1-8.*
(Continued)

*Primary Examiner* — J. Allen Shriver, II
*Assistant Examiner* — Steve Clemmons
(74) *Attorney, Agent, or Firm* — Polster, Lieder, Woodruff & Lucchesi, LC

(57) ABSTRACT

A hydraulic module designed to be mounted on a hydraulic hybrid vehicle, characterised in that it forms a rigid and compact assembly comprising a body (32) receiving the high- and low-pressure accumulators intended to supply traction motors of the vehicle, comprising a generally parallelepipedal shape, and having attachment means designed to be fixed under a floor at the rear of the vehicle.

6 Claims, 2 Drawing Sheets

(52) U.S. Cl.
CPC ....... *F15B 2201/00* (2013.01); *Y02T 10/6208* (2013.01)

(58) Field of Classification Search
CPC ........ B62D 65/02; F15B 1/04; F15B 2201/00; F15B 2201/40; Y02T 10/6208
See application file for complete search history.

(56) References Cited

U.S. PATENT DOCUMENTS

| | | | | |
|---|---|---|---|---|
| 6,875,258 | B2* | 4/2005 | Kuperus | B60K 15/063 123/519 |
| 7,232,192 | B2* | 6/2007 | Teslak | B60K 6/12 180/165 |
| 7,296,407 | B2* | 11/2007 | Rose | B60K 6/12 60/414 |
| 7,624,753 | B2* | 12/2009 | Suess | B60K 15/03006 137/259 |
| 8,056,928 | B2* | 11/2011 | Ijaz | B60K 15/013 280/830 |
| 8,083,263 | B2* | 12/2011 | Yamanami | B60K 15/07 280/830 |
| 8,857,167 | B2* | 10/2014 | Johnson | F15B 1/165 138/30 |
| 8,960,344 | B2* | 2/2015 | Ozawa | B60K 1/04 180/68.1 |
| 9,028,354 | B2* | 5/2015 | Johnson | B60K 6/12 475/72 |
| 2004/0103656 | A1* | 6/2004 | Frazer | B60K 6/12 60/414 |
| 2004/0251067 | A1 | 12/2004 | Gray, Jr. et al. | |
| 2009/0172942 | A1 | 7/2009 | Hindle | |
| 2010/0116576 | A1* | 5/2010 | Jufuku | B60K 1/04 180/68.5 |
| 2010/0252353 | A1* | 10/2010 | Tsubokawa | B60K 15/07 180/314 |
| 2011/0303048 | A1* | 12/2011 | Genise | B60K 6/12 74/665 A |
| 2014/0242447 | A1* | 8/2014 | Nomura | B60L 11/005 429/163 |

FOREIGN PATENT DOCUMENTS

GB 2415671 A 1/2006
JP 2009255759 A * 11/2009

OTHER PUBLICATIONS

International Search Report of corresponding application PCT/FR2013/053149 mailed Mar. 18, 2014.

* cited by examiner

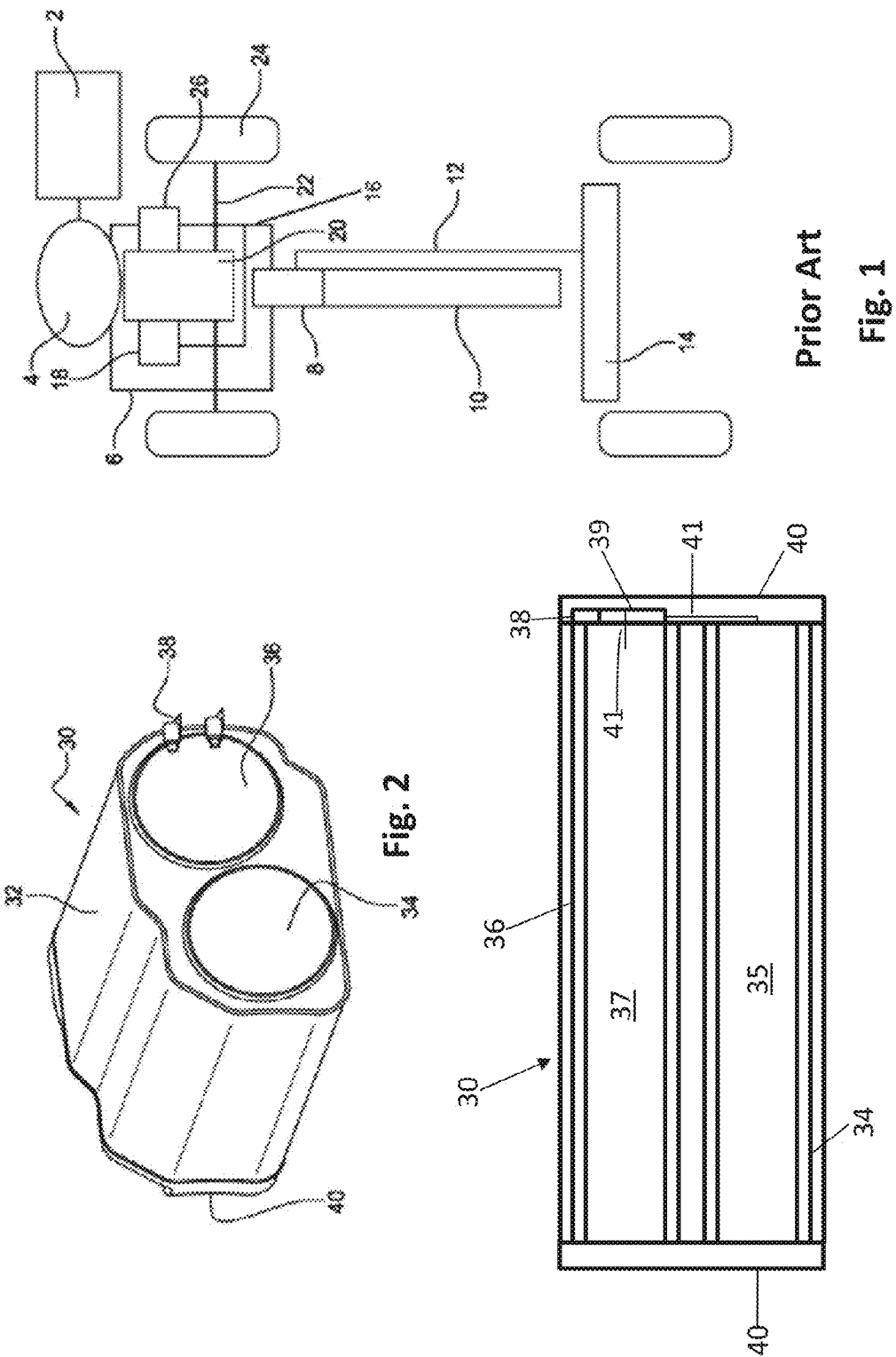

HYDRAULIC MODULE COMPRISING HIGH AND LOW PRESSURE ACCUMULATORS, FOR A HYBRID VEHICLE

CROSS-REFERENCE TO RELATED APPLICATIONS

The present application is the US National Stage under 35 US §371 of PCT/FR2013/053149 filed Dec. 18, 2013, which in turn claims priority to French application 1350109 filed on Jan. 7, 2013, the content of which (text, drawings and claims) is incorporated herein by reference.

BACKGROUND

The present invention relates to a module comprising high and low pressure hydraulic accumulators for a hybrid vehicle, and a hybrid vehicle comprising such module.

Certain hybrid vehicles have an internal combustion engine which drives a hydraulic pump to recharge accumulators with pressurized fluid in order to store energy, and hydraulic motors supplied by these accumulators driving the traction wheels of the vehicle. These vehicles also comprise a hydraulic pump connected to the traction wheels, in order to recuperate the kinetic energy of the vehicle during braking and to recharge the accumulators.

The hydraulic accumulators may comprise in particular a high pressure accumulator receiving pressure from the hydraulic pumps in order to supply the motors, and a low pressure accumulator receiving the fluid returning from these motors.

These hybrid vehicles optimize the operation of the combustion engine by reducing its fuel consumption and emissions of polluting gas. With the stored hydraulic energy, the vehicle can drive in strictly hydraulic mode called "ZEV", without emission of polluting gas, while the combustion engine is stopped.

A known type of hydraulic motor, specifically disclosed in document FR-A1-2972682, comprises a rigid assembly containing the pressure accumulators, the hydraulic command block and the hydraulic traction motors, which are all mounted together.

A particular configuration presented in the document comprises traction motors installed on the front axle, which are mounted to the hydraulic command block and a first reservoir installed longitudinally under the vehicle, while the second reservoir is mounted transversally behind the first reservoir.

One problem posed by this particular configuration is that the rigid assembly is not easily adaptable to a hybrid vehicle with a combustion engine in front and a fuel tank installed under the rear passenger seats, which is the conventional platform of a vehicle with a combustion engine only.

In particular, the front part comprising the hydraulic command blocks and the first reservoir installed longitudinally under the vehicle requires significant modification of the platform of this vehicle, and takes up part of the space reserved for the fuel tank, significantly reducing its capacity.

In addition, this rigid assembly extending over most of the length of the vehicle poses important problems of passenger safety, in particular in case of a frontal or lateral collision at high vehicle speed.

SUMMARY

The goal of the present invention is to eliminate these disadvantages of prior art.

To this end, a hydraulic module is provided which is intended to be mounted on a hydraulic hybrid vehicle, characterized in that it forms a rigid and compact assembly comprising a generally parallelepipedal shaped body receiving the high and low pressure accumulators for supplying the traction motors of the vehicle, and provided with mounting means for underfloor mounting in the rear of the vehicle.

One advantage of the hydraulic module is that it can be installed flat under the rear trunk of the vehicle, while preserving the majority of the floor of a conventional vehicle in front of the rear axle, including the fuel tank which is not modified, in order to obtain significant standardization for the different types of vehicles built on the same platform.

The hydraulic module may comprise in addition one or more of the following characteristics, which may be combined.

Advantageously, the hydraulic module body comprises cylindrical bores, forming a support for the pressure accumulators.

Advantageously, the hydraulic module comprises transversally mounted cylindrical reservoirs.

In particular, the hydraulic module can comprise a high pressure accumulator and a low pressure accumulator juxtaposed one behind the other.

Advantageously, the hydraulic module comprises lids arranged on the lateral sides, covering the extremities of the hydraulic accumulators.

Advantageously, the hydraulic module comprises supports along its periphery, forming substantially horizontal planes, intended for mounting under the floor of the vehicle.

Advantageously, each support comprises elastic means for mounting to the floor of the vehicle.

Advantageously, the hydraulic module comprises a hydraulic command block integrated in this module.

The goal of the invention is also a hybrid vehicle comprising high and low pressure accumulators connected to hydraulic motors and pumps, whereby these accumulators are integrated in a hydraulic module comprising any one of the preceding characteristics.

In particular, the vehicle may comprise an "H" rear axle comprising a crossbeam attached at its ends to longitudinal suspension arms, while the module is mounted flat under the trunk of the vehicle, just behind the crossbeam.

DESCRIPTION OF THE DRAWINGS

The invention will be better understood and other characteristics and advantages will be made clear in the following description provided as an illustrative example, with reference to the attached drawings in which:

FIG. 1 is a diagram presenting in top view a hybrid vehicle comprising different hydraulic elements arranged in known manner;

FIG. 2 is a perspective view of a hydraulic module according to the invention;

FIG. 4 is a schematic drawing of the hydraulic module.

DETAILED DESCRIPTION

Figure 3:
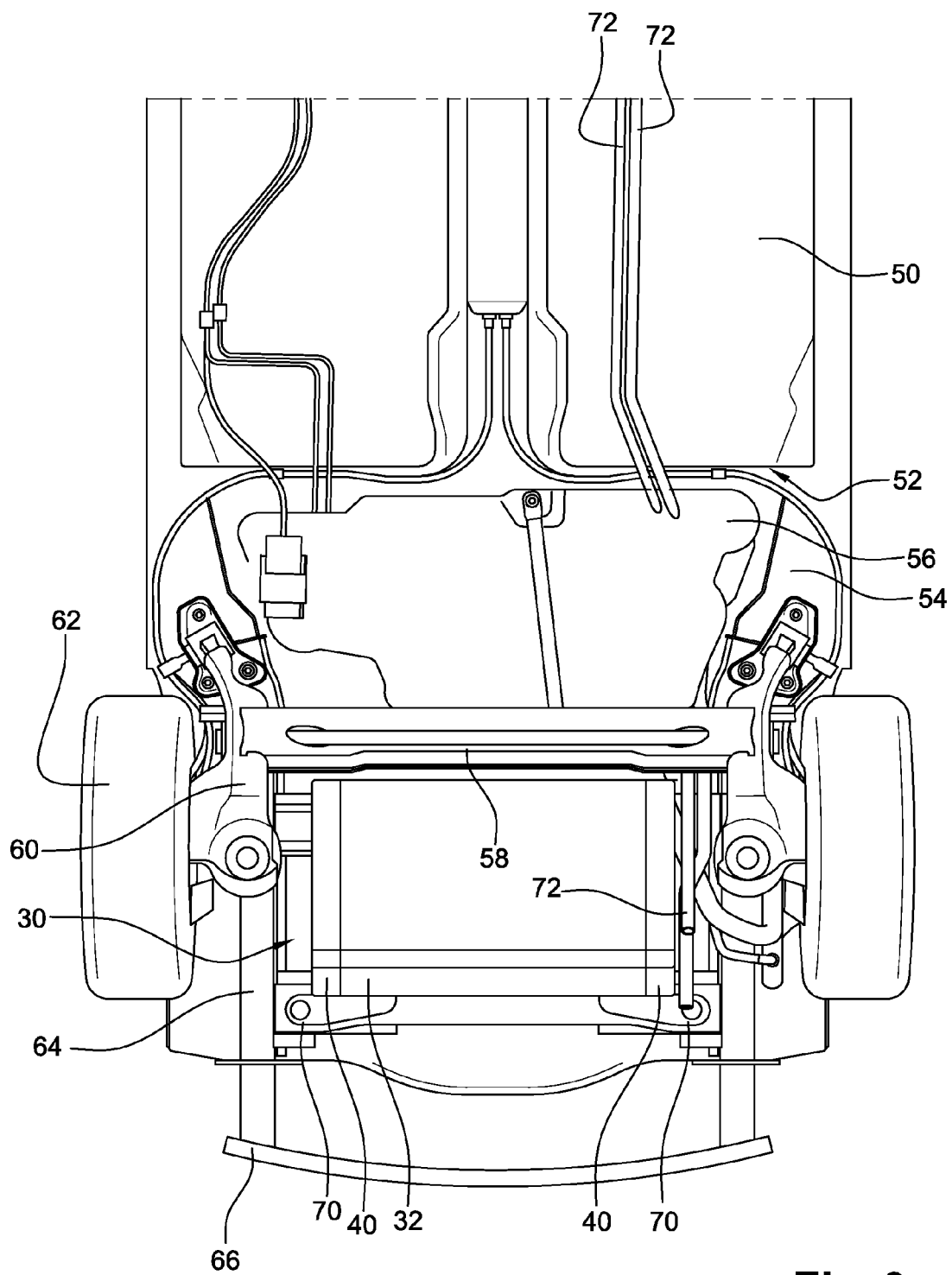
FIG. 3 is a bottom view of the rear end of a hybrid vehicle comprising this module.

FIG. 1 shows a hybrid vehicle comprising a combustion engine 2 connected directly to a first hydraulic pump 4, which receives supply fluid through a low pressure circuit 16, and returns it at high pressure to a high pressure circuit 6.

The low pressure circuit 16 and the high pressure circuit 6 are connected to a hydraulic command block 8, which controls the hydraulic motor 18 and a second hydraulic pump 26.

The hydraulic command block 8 is mounted in front of the long high pressure accumulator 10, installed longitudinally under the floor of the vehicle. A low pressure accumulator 14 extending in a lateral direction, and disconnected from the high pressure reservoir, is installed under the vehicle behind the high pressure reservoir.

The hydraulic command block 8 is directly connected via an internal high pressure line to the high pressure accumulator 10, and via an external low pressure line 12 to the low pressure accumulator 14.

A transmission 20 with various gear ratios, supports on one side the hydraulic motor 18 which transmits mechanical power to the front traction wheels 24 via the wheel drive shafts 22, while drawing energy from the high pressure accumulator 10, and on the other side the second hydraulic pump 26 which receives mechanical power from the traction wheels, to recharge the accumulators.

This arrangement of the two pressure accumulators 10, 14 is relatively bulky and is not suitable for a high level of standardization between the different types of hybrid vehicles, or non-hybrid vehicles, using the same platform.

Furthermore, since each accumulator 10, 14 is independently mounted under the vehicle, it requires proper elastic fasteners to filter the vibrations. A certain number of hydraulic lines must be provided to connect the different hydraulic components, requiring mounting brackets and couplings involving risk of vibrations, leaks and rupture through material fatigue.

In addition, assembling and connecting these different elements under the floor of the vehicle is a relatively time consuming and complex operation.

FIG. 2 shows a top view of a hydraulic module 30, with, as seen from above, a generally parallelepipedal shaped main body 32, with the rectangular shape extending in a transverse direction, and a height which is small compared to the dimensions of the rectangular shape.

The main body 32 comprises two cylindrical passages 34, 36 of constant cross-section arranged transversally and juxtaposed one behind the other, which take up most of the volume of the body. Advantageously, the body 32 is made of a light material, such as an aluminum alloy or plastic material, which for instance can be molded or extruded to form a continuous profile.

Each cylindrical passage 34, 36 is prepared to accommodate a high or low pressure accumulator 35, 37, comprising a cylindrical part which fits in the passage, and two pressure resistant dome shaped lids closing the extremities.

A hydraulic command block 39 is integrated in one side of the module 30, and directly connected to the accumulators via short pressure lines 41, with a much simplified system of connections with improved reliability, reduced weight and lower cost.

The rear hydraulic accumulator comprises external hydraulic couplings 38 mounted in the back of the main body 32, and directly coupled to the accumulator. The couplings are connected to pressure lines starting in the front of the vehicle. Since these external couplings 38 are not located on a lateral side of the module 30, the width of the module is reduced.

Each lateral side of the hydraulic module 30 is closed by a protective lid 40, covering the extremities of the hydraulic accumulators, the hydraulic block and the internal couplings, in order to protect them from splashing water in particular. Note that the protective lid in the front of the figure is not shown.

The hydraulic module 30 comprises also fastening means, not shown in the figure, in order to mount it directly under the floor of the vehicle.

FIG. 3 shows the rear part of the vehicle comprising a substantially flat floor 50 which terminates in a rear vertical edge 52 separating it from a second upper part 54 at greater height.

A fuel tank 56 fills the space below the upper part of the floor 54, and lies longitudinally between the vertical edge 52 and the crossbeam 58 of the rear axle supporting the rear wheels 62.

The rear axle called an "H" axle, comprises the crossbeam 58 with each of its ends rigidly mounted to the central part of a longitudinal suspension arm 60. The front part of these arms is connected by means of joint to the body of the vehicle, while the rear extremity is supporting a wheel 62. This type of rear axle is easy to fabricate, and frees up substantial space behind the crossbeam 58, between the suspension arms.

The fuel tank 56 and the rear axle are similar to those of conventional vehicles equipped with a combustion engine only.

The body of the vehicle comprises two longitudinal side members 64 installed on both sides under the trunk, above the suspension arms 60. A crossmember 66 mounted to the rear end of the side members 64, supporting the not shown rear bumper, is offset towards the rear relative to the body of the vehicle in order to create free space for deformation in case of a rear end collision.

The hydraulic module 30 is mounted flat under the trunk of the vehicle, by means of supports 70 arranged along its periphery, in particular at each corner of the module, forming a horizontal plane comprising each with a hole in which an elastic fastener is placed in order to filter vibrations. The installation of the module 30 under the body of the vehicle is easy and fast by feeding this module vertically under the trunk while engaging the elastic fasteners in the holes, and then tightening the fasteners.

The high and low pressure lines 72 coming from the front of the vehicle and mounted under the floor, are then coupled to the hydraulic module 30.

The hydraulic module 30, including the two accumulators and the hydraulic body, requires only a limited number of elastic fasteners to hold these elements under the vehicle, which ensures good acoustic performance, simplifies the assembly and reduces cost.

In addition, the two accumulators can be placed close together in the hydraulic module 30, because they require no space between them, which is necessary when these two elements are mounted independently from each other by means of their own elastic fasteners, in order to provide relative movement between them.

The hydraulic module 30 with its generally parallelepipedal shape substantially fills all of the space below the floor of the trunk, longitudinally between the crossbeam 58 of the rear axle and the rear part of the body of the vehicle, and laterally between the two suspension arms 60. In this way, by raising the height of the trunk floor, which is a small modification of the platform of conventional vehicles, the volumes under the body are optimized and completely filled.

Alternatively, the hydraulic module 30 can comprise more than two independent low and high pressure hydraulic accumulators, connected with each other directly inside this module by internal pressure lines.

The hydraulic module 30 according to the invention reduces the mass of hydraulic hybrid vehicles and simplifies the design as well as the assembly operations on the assembly line of the manufacturer, it also facilitates after sales service by providing quick exchange of the whole unit.

The invention claimed is:

1. A hydraulic module intended to be assembled on a hydraulic hybrid vehicle; the hydraulic module being sized, shaped, and adapted to be mounted beneath the floor of the vehicle; the hydraulic module forming a rigid and compact assembly, and comprising:
   a body comprising top and bottom surfaces, front and back surfaces, and opposed lateral sides; said body defining a pair of parallel, cylindrical passages extending between the opposed lateral sides;
   low and high pressure accumulators received in said passages; said low and high pressure accumulators being parallel and adjacent each other when received in said body; said low and high pressure accumulators defining a part of a hydraulic circuit when said hydraulic module is mounted to the vehicle to supply power to a traction motor of the vehicle;
   a hydraulic command block positioned on one of said opposed lateral sides of said body to be integrated into said module; said command block being directly connected to said low and high pressure accumulators via pressure lines:
   hydraulic couplings adapted to connect said hydraulic command block to the hydraulic circuit when said hydraulic module is mounted to the vehicle;
   lids which cover the lateral sides of the hydraulic module and extremities of said low and high pressure accumulators; said command block and said hydraulic couplings being enclosed by one of said lids; and
   supports positioned along a periphery of the body, said supports forming substantially horizontal planes for mounting the body under the floor in the rear of the vehicle.

2. The hydraulic module according to claim 1 wherein said cylindrical passages, and hence said low and high pressure accumulators, extend transverse to an axis of said body.

3. The hydraulic module according to claim 2 wherein said high pressure accumulator and said low pressure accumulator are juxtaposed one behind the other in said body.

4. The hydraulic module according to claim 1, wherein the supports comprise discrete support elements, each support element comprising elastic means for fastening to the floor of the vehicle.

5. A hydraulic hybrid vehicle comprising the hydraulic module of claim 1.

6. The hydraulic hybrid vehicle according to claim 5, further comprising an "H" rear axle; said rear axle comprising a crossbeam mounted at opposite ends to longitudinal suspension arms, whereby the hydraulic module is mounted flat under a trunk of the vehicle, just behind the crossmember.

* * * * *